United States Patent [19]
Murray

[11] Patent Number: 5,369,802
[45] Date of Patent: Nov. 29, 1994

[54] METHOD AND APPARATUS FOR IMPROVED BATTERY REPLACEMENT

[75] Inventor: Bradley A. Murray, West Palm Beach, Fla.

[73] Assignee: Motorola, Inc., Schaumburg, Ill.

[21] Appl. No.: 867,959

[22] Filed: Apr. 13, 1992

[51] Int. Cl.$^5$ .................... H04B 1/08; H01M 2/10
[52] U.S. Cl. ........................ 455/351; 429/96; 340/825.44
[58] Field of Search ............. 455/38.4, 89, 90, 343, 455/347, 348, 349, 351; 429/96, 97, 99, 100; 368/203; 340/825.44

[56] References Cited

U.S. PATENT DOCUMENTS

| | | | |
|---|---|---|---|
| 3,984,257 | 10/1976 | Zurcher | 429/96 |
| 3,999,110 | 12/1976 | Ramstrom et al. | 429/96 |
| 4,731,306 | 3/1988 | Dumbser | 429/96 |
| 5,193,220 | 3/1993 | Ichinohe et al. | 455/89 |

FOREIGN PATENT DOCUMENTS 32766  3/1978  Japan ..................... 368/203

Primary Examiner—Reinhard J. Eisenzopf
Assistant Examiner—Thanh C. Le
Attorney, Agent, or Firm—Pablo Meles; John H. Moore

[57] ABSTRACT

A battery operated electronic device includes electronic circuits (10, 12, 14, 16, 18, 20), and a battery holder (218, 222, 226) electrically coupled to the electronic circuits (10, 12, 14, 16, 18, 20) for holding a first replaceable battery (216) and for electrically coupling the first replaceable battery (216) and the electronic circuits (10, 12, 14, 16, 18, 20), and for delivering power thereto. The battery holder (218, 222, 226) allows replacement of the first replaceable battery (216) in the battery holder (218, 222, 226) with a second replaceable battery (238). The second replaceable battery (238) can be utilized to displace the first replaceable battery (216) from the battery holder (218, 222, 226) in the battery replacement operation. Further, a method is provided for the battery replacement operation.

11 Claims, 3 Drawing Sheets

METHOD AND APPARATUS FOR IMPROVED BATTERY REPLACEMENT

FIELD OF THE INVENTION

This invention relates generally to battery operated devices, and more particularly to an improved method and apparatus for replacing batteries in battery operated devices.

BACKGROUND OF THE INVENTION

Many electronic devices, including portable electronic devices such as selective call receivers, utilize a replaceable battery for a power source. Typically, the replaceable battery is held in a battery compartment in the electronic device during use. A replacement operation normally involves opening a door or cover to the battery compartment and removing a depleted battery. Then, a fresh battery is inserted into the battery compartment and the door or cover is closed to complete the replacement operation. During the battery replacement operation, power is removed from the electronic device.

Additionally, sometimes a tool is necessary to help open and/or close the door or cover to the battery compartment. For example, sometimes the edge of a coin serves as a screw driver to open and close the cover to the battery compartment.

Regrettably, this conventional battery replacement procedure tends to be cumbersome, can require an additional tool which may not always be readily available, and removes power from the electronic device to effect the battery replacement. Moreover, in many communication applications, the loss of power and the ability to communicate, even for a brief time interval, is unacceptable. For example, in a governmental or emergency communication system, losing messages can have serious consequences.

Thus, what is needed is a simpler more reliable method and apparatus for battery replacement, preferably allowing battery replacement to be performed while maintaining continuous uninterrupted power to the electronic device.

SUMMARY OF THE INVENTION

In carrying out one form of this invention, there is provided a battery operated electronic device, comprising electronic circuits, and a battery holder electrically coupled to the electronic circuits for holding a first replaceable battery and for electrically coupling the first replaceable battery and the electronic circuits, the battery holder comprising means for allowing replacement of the first replaceable battery in the battery holder with a second replaceable battery, the second replaceable battery utilized with the means for allowing replacement to displace the first replaceable battery from the battery holder. Further, a method is provided for the battery replacement operation.

DESCRIPTION OF A PREFERRED EMBODIMENT

Figure 1:
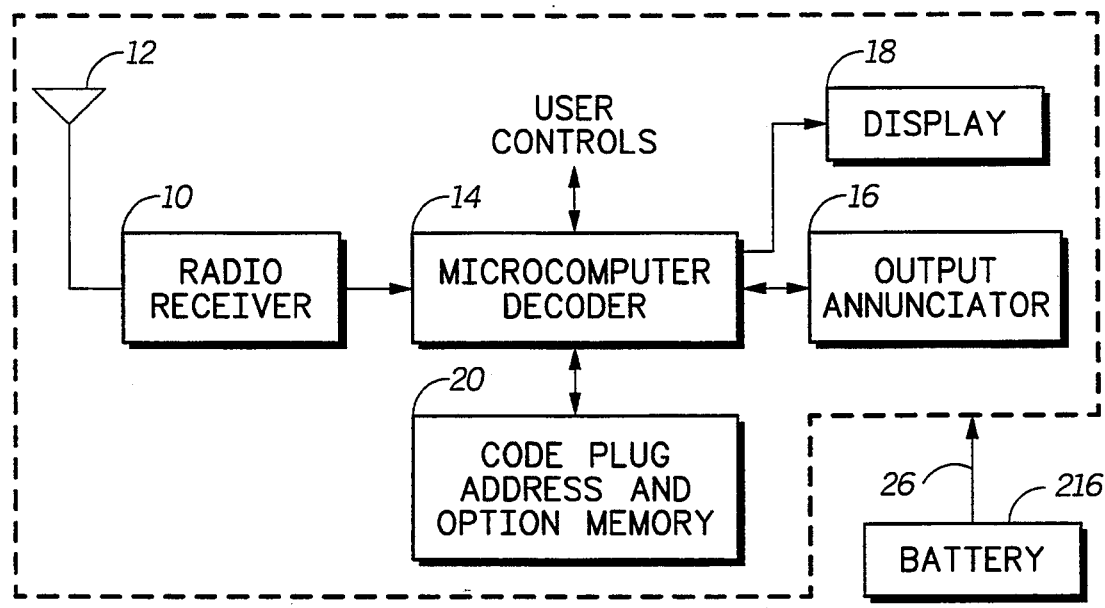
FIG. 1 is an electrical block diagram of a pager, in accordance with the present invention.

FIG. 1 is an electrical block diagram of a selective call receiver, e.g. a pager. It includes radio receiver circuitry 10 which receives signals via an antenna 12. The received signals include paging information, also including received messages that were transmitted such as from a paging system. The output of the radio receiver circuitry 10 is applied to a microcomputer decoder 14 which processes the information contained in the received signals, such as received messages. As can be seen, the microcomputer decoder 14 communicates with an output annunciator 16, such as a transducer or speaker, a display 18, such as a liquid crystal display (LCD), and a code plug address and option memory 20. The annunciator 16 alerts a user that a message has been received by the pager. The message can be stored in memory, such as in a portion of the memory 20. The message can then be presented to the user, such as by the display 18. The user can activate user controls, such as buttons or switches, to invoke functions in the pager. Normally, a battery 216 provides (electrically couples 26) power to the electronic circuits of the pager, such as the radio receiver 10, the microcomputer decoder 14, the memory 20, the display 18, and the output annunciator 16. The operation of a paging receiver of the general type shown in FIG. 1 is well known and is more fully described in U.S. Pat. No. 4,518,961, issued May 21, 1985, entitled "Universal Paging Device with Power Conservation.", which is assigned to the same assignee as the present invention.

Figure 2:
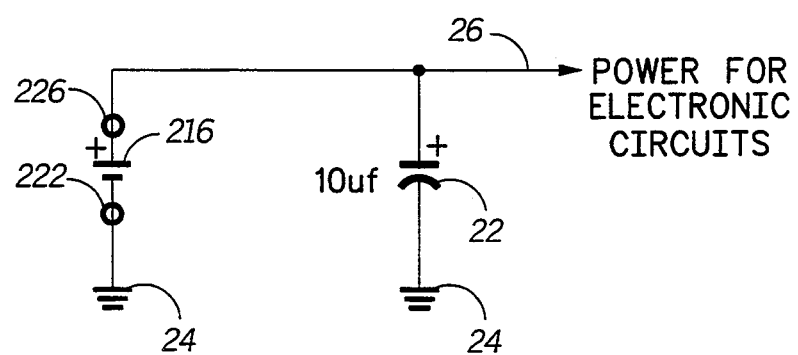
FIG. 2 is an electrical schematic diagram of a battery holder, according to a preferred embodiment of the present invention.

FIG. 2 is an electrical schematic diagram of a battery holder, according to a preferred embodiment of the present invention. A positive battery contact 226 and a negative battery contact 222 are mechanically coupled to the battery holder and can make an electrical circuit with a replaceable battery 216. For illustration, a button cell battery, such as are commonly used in watches (or watch pagers), will be assumed. However, other types of batteries, such as AA or AAA type batteries, are also contemplated for the improved replacement operation.

The negative battery contact 222 is electrically coupled to the ground 24 for the electronic device, such as a radio receiver or pager. The positive battery contact 226 electrically couples 26 power to the electronic circuits for the pager, such as the radio receiver 10 (FIG. 1), the microcomputer decoder 14, the memory 20, the display 18, and the output annunciator 16.. Further, the power for the electronic circuits 26 can operationally be a switched power source. In this way, a user can selectively turn on or off the pager, to conserve power when not in use.

Preferably, an integrating capacitor 22 is electrically coupled across the positive battery contact 226 and the negative battery contact 222. This topology integrates out any power transients or interruptions caused by mechanical bounce of the battery 216 relative to the battery contacts 226, 222, such as can occur when the pager is dropped. Further, the integrating capacitor 22 helps maintain continuous power for the radio receiver during the battery replacement operation, as will be more fully discussed below.

Figure 3:
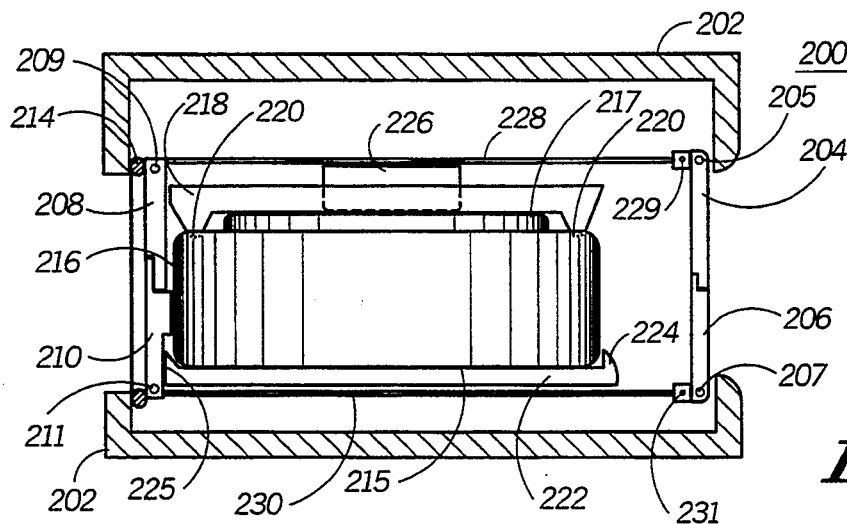
FIG. 3 is a side cut-away view of a battery compartment and battery holder, according to the preferred embodiment of the present invention.

FIG. 3 is a side cut-away view of a battery compartment 200 and battery holder 218, 222, 226, according to the preferred embodiment of the present invention. The battery compartment 200 is located within the housing 202 for the electronic device, e.g., the pager housing 202.

The battery 216 is held in a battery holder 218, 222, 226, in the battery compartment 200. The battery holder 218, 222, 226, comprises the positive battery contact 226 and the negative battery contact 222 in substantially opposing orientation to each other, which typically maintain constant mechanical contact with the positive terminal 217 and negative terminal 215 of the battery 216. The positive and negative battery contacts 226, 222, are preferably constructed from beryllium copper and are gold plated, using known methods and techniques.

Either the positive battery contact 226, or the negative battery contact 222, or both may be spring mounted to maintain mechanical contact (and electrical contact) with the battery terminals 215, 217 on the battery 216. Preferably, the spring mounting uses cantilever construction or leaf springs to conserve space in the pager housing 202. Alternatively, coil springs can be used. In the preferred embodiment, the positive battery contact 226 is spring mounted, and the negative battery contact 222 is fixed in one position.

Additionally, a battery holding structure 218 is also spring mounted on a separate spring system, preferably in substantially opposing orientation to the negative battery contact 222 to maintain continuous securing pressure on the battery 216. A gripping structure 220, such as gripping fingers or ribs, can be molded from a non-conductive material such as polycarbonate, or other suitable construction, to engage with the battery 216 about a trough that normally separates the positive battery terminal 217 from the rest of the battery 216.

The negative battery contact 222 includes a catching structure 224 and a ramp 225 which also help secure the battery 216 in the battery holder 218, 222, 226. The catching structure 224 captures the battery 216 and prevents the battery 216 from moving back to a pair of entry doors 204, 206, as will be more fully discussed below.

The constant pressure from two sides of the battery 216 in combination with the gripping structure 220 and the catching structure 224 and the ramp 225 hold the battery 216 secure within the battery holder 218, 222, 226. In the event that the pager is dropped, which typically imparts a substantial mechanical shock wave to the battery holder 218, 222, 226, the integrating capacitor 22 (FIG. 2) integrates out any momentary disconnect of the battery 216 for maintaining continuous uninterrupted power to the pager. A ten micro farad capacitor 22 normally is sufficient to serve this purpose.

The battery compartment 200 additionally secures the battery 216 in the battery holder 218, 222, 226, with the pair of entry doors 204, 206, and a pair of exit doors 208, 210. Preferably, the entry doors 204, 206, and the exit doors 208, 210, respectively, are at least partially overlapping with each other for preventing contamination from external hazards such as dust. Further, a gasket or seal ring 214 can seal the gap between the doors, such as the exit doors 208, 210 and the pager housing 202. The seal ring 214, which may also be located between the entry doors and the pager housing 202, additionally protects the battery compartment 200 from external contaminants.

The entry doors 204, 206, and the exit doors 208, 210, are individually mounted on pivots 205, 207, 209, 211, respectively. The entry doors 204, 206, can pivot into the pager housing 202, and the exit doors 208, 210, can pivot out from the pager housing 202. Preferably, all the pivots 205, 207, 209, 211 are individually spring loaded to maintain a restoring mechanical tension on their respective doors 204, 206, 208, 210. The restoring spring tension on the pivots 205, 207, 209, 211, help restore the doors 204, 206, 208, 210, to their closed position, as shown.

The exit doors 208, 210, are additionally secured in the closed position, as shown, with locking rods 228, 230, which are pivotally coupled 229, 231, to the entry doors 204, 206. The locking rods 228, 230, preferably include four semi-rigid rod structures located about the four outer corners of the doors 204, 206, 208, 210. In this arrangement, the locking rods 228, 230, help maintain the exit doors 208, 210, locked when in the closed position, while not interfering with the battery replacement operation when the entry and exit doors 204, 206, 208, 210 are in the open position.

Optionally, the locking rods 228, 230, can be substituted with two semi-rigid sheets 228, 230, pivotally coupled to and extending from the entry doors 204, 206, to the exit doors 208, 210. Preferably, the semi-rigid sheets 228, 230, comprise plastic construction. Also, as necessary, the plastic sheets 228, 230, can have features cut out in their centers to allow spring mounting of the battery holder 218, 222, 226.

In the preferred embodiment, the locking rods 228, 230, extend from their pivots 229, 231, on the entry doors 204, 206, to contact the respective exit doors 208, 210, at their inner surfaces about the pivots 209, 211. This arrangement can prevent the exit doors 208, 210, from pivoting open when the entry doors 204, 206, are in the closed position. Optionally, recesses on the inner surfaces of the exit doors 208, 210, at the contact points cooperatively connect with the locking rods 228, 230, to capture each locking rod 228, 230, when the doors 204, 206, 208, 210, are in the closed position. With the entry doors 204, 206, in their closed position, the locking rods 228, 230, help maintain the exit doors 208, 210, in their locking position for securing the battery 216 in the battery compartment 200.

Additionally, the entry doors 204, 206, are preferably recessed within the pager housing 202, such that the entry doors 204, 206, are prevented from pivoting out from the pager housing 202. The pager housing 202 can extend over the entry doors 204, 206, past the pivots 205, 207. This arrangement protects the battery 216 from exiting the battery compartment 200 back through the entry doors 204, 206.

Figure 4:
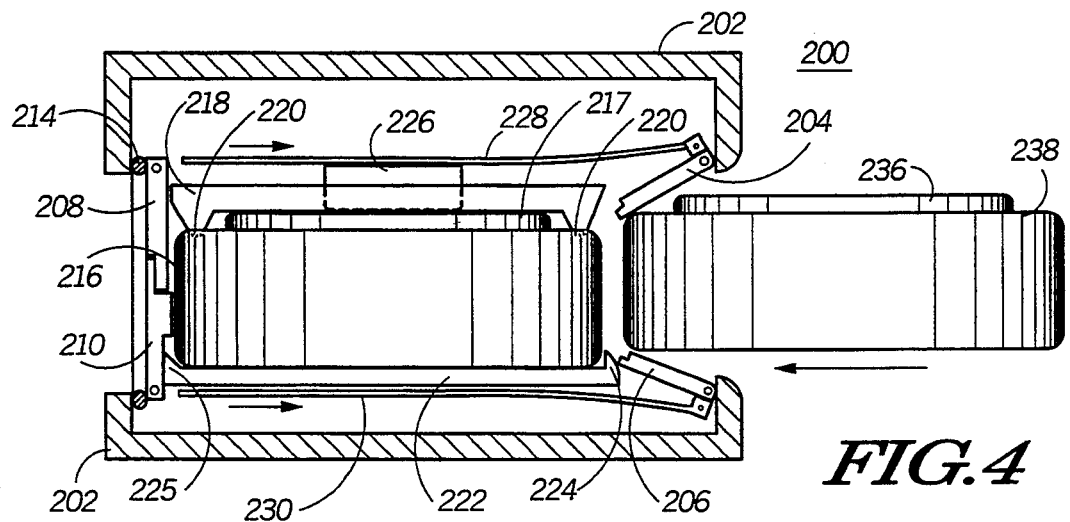
FIG. 4 shows a battery being inserted into the battery compartment of FIG. 3 during a battery replacement operation, according to the preferred embodiment of the present invention.

FIG. 4 shows a battery 238 being inserted into the battery compartment 200 during a battery replacement operation, according to the preferred embodiment of the present invention. The battery 238 with the positive battery terminal 236 oriented as shown, is inserted into the battery compartment 200 by pushing on the entry doors 204, 206, that pivot inwardly with some resistance from the spring loaded pivots 205, 207. As the entry doors 204, 206, pivot inwardly, the locking rods 228, 230, retract from the exit doors 208, 210, thereby unlocking the exit doors 208, 210. The battery being inserted 238 pushes the battery being replaced 216 out of the battery compartment 200 through the unlocked exit doors 208, 210. The ramp 225 on the negative battery contact 222 helps guide the battery being replaced 216 out through the exit doors 208, 210. Further, the gripping structure 220 is preferably slanted toward the exit doors 208, 210, to also help guide the battery being replaced 216 out through the exit doors 208, 210. By utilizing the battery being inserted 238 in the replacement operation to also displace the battery being replaced 216 out from the battery compartment 200, one simple efficient insertion motion can both insert the battery being inserted 238 and push out (replace) the battery being replaced 216.

Figure 5:
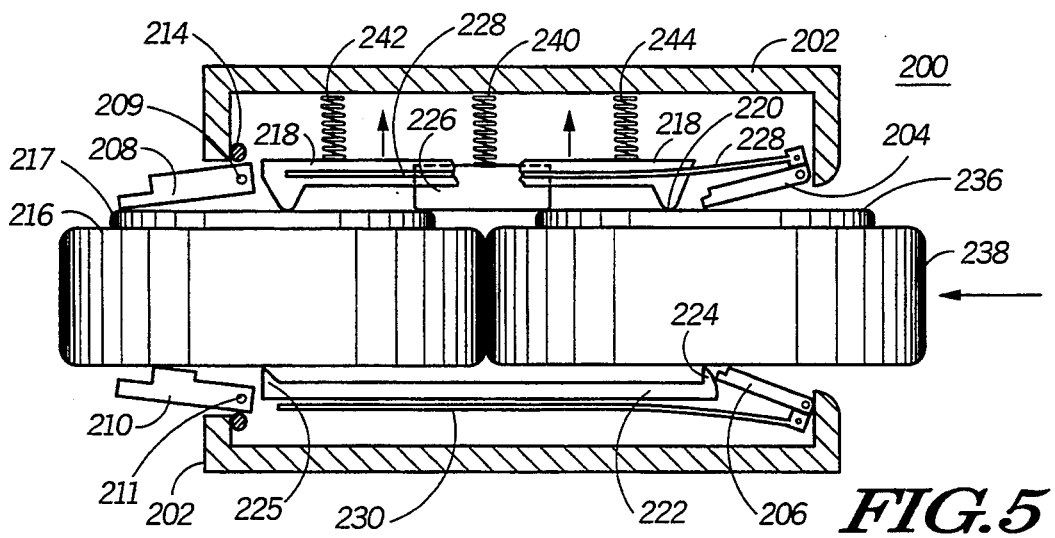
FIG. 5 illustrates a continuation of the battery replacement operation of FIG. 4 with the battery being inserted into the battery holder of FIG. 3, in accordance with the preferred embodiment of the present invention.

FIG. 5 illustrates a continuation of the battery replacement operation, with the battery 238 being inserted into the battery holder 218, 222, 226, in accordance with the preferred embodiment of the present invention. The battery holding structure 218 and the locking rod 228 are cut away to reveal the positive battery contact 226 being separately spring mounted 240 from the spring mounted 242, 244, battery holding structure 218. The longitudinal dimensions of the positive battery contact 226 allow the positive battery contact 226 to make electrical contact with the positive battery terminal 236 of the battery being inserted 238 before breaking electrical contact with the positive battery terminal 217 of the battery being replaced 216. Hence, this "make-before-break" electrical coupling arrangement allows continuous and uninterrupted power to be delivered to the electronic circuits in the pager, such as the radio receiver 10 (FIG. 1), the microcomputer decoder 14, the memory 20, the display 18, and the output annunciator 16, even while the battery 216 is being replaced. This "make-before-break" feature of the battery holder 218, 222, 226, can maintain continuous and uninterrupted power to the pager, for example, to prevent information from being lost from the memory 20 (in the case of a volatile memory), and to prevent a message, such as may be transmitted from a paging system, from being lost, i.e., not being received and stored by the pager. In the latter case, for example, a "lost message" in governmental or emergency communication system can have serious consequences.

Once the positive battery terminal 236 of the battery being inserted 238 is inserted past the gripping structure 220, the downward pressure of the gripping structure 220 tends to draw the battery 238 into the battery holder 218, 222, 226. When the battery 238 extends just past the catching structure 224 of the negative battery contact 222, the battery 238 is captured in the battery holder 218, 222, 226. At the same time, the battery being replaced (the depleted battery) 216 is completely pushed out through the exit doors 208, 210 by the battery being inserted (the fresh battery) 238. All the spring loaded pivoted doors 204, 206, 208, 210, then return to their closed position. The battery replacement operation is now complete, with the fresh battery 238 being secured in the battery holder 218, 222, 226 within the battery compartment 200.

Figure 6:
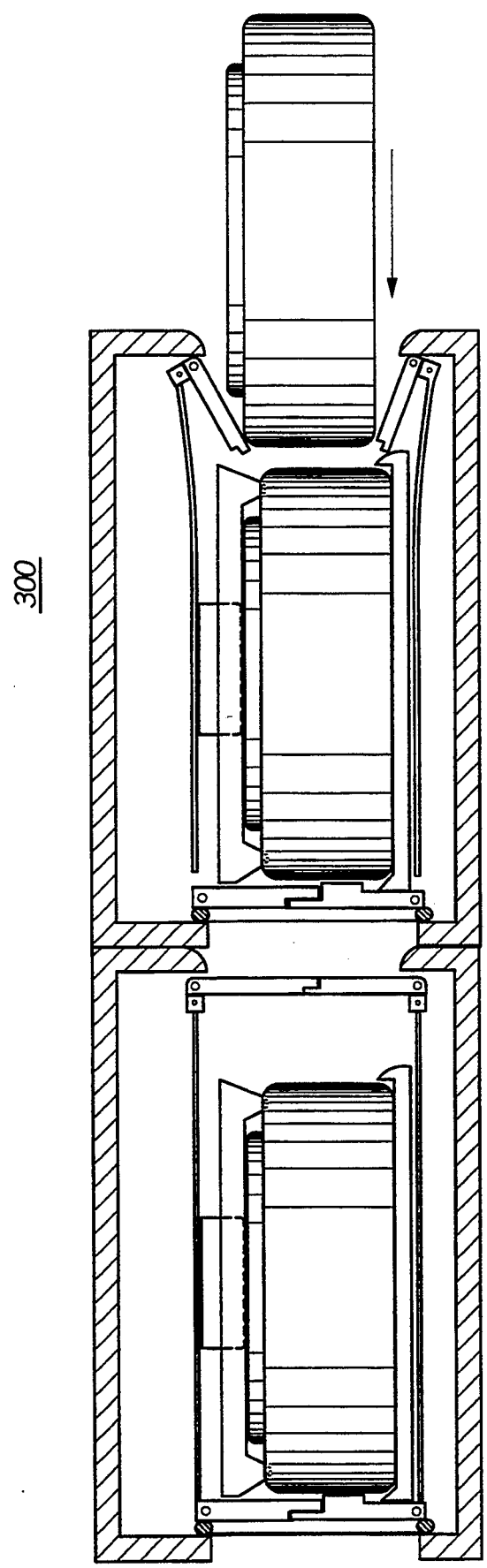
FIG. 6 is a side cut-away of first and second battery holders, in accordance with the present invention.

In battery operated products powered from more than one battery, it is possible to include more than one battery holder 218, 222, 226, arranged adjacent to each other in sequential order, as shown in FIG. 6 in battery holder arrangement 300, such that the battery exiting a first battery holder then enters a second battery holder in the sequence. The battery that was in the second battery holder is displaced out from the second battery holder by the entering battery. For example, the battery entering the second battery holder can push the battery being replaced out from the second battery holder. This sequence continues displacing batteries in subsequent battery holders until the last battery in the last battery holder is displaced out from the last battery holder, and optionally out through the exit doors 208, 210, of the battery compartment 200. In this way, a battery replacement operation of more than one battery can be effected by inserting the necessary number of batteries into the respective sequentially arranged battery holders. For example, an electronic device powered from four AA type batteries may have four battery holders holding the four batteries. The four battery holders can be arranged sequentially adjacent to each other, as described above. To replace the four batteries, four additional batteries can be inserted one at a time into the first battery holder. Each additional battery being inserted displaces one of the batteries being replaced from the sequence of battery holders. When the fourth battery is inserted into the first battery holder, the fourth battery being replaced is displaced out from the fourth battery holder. This completes the battery replacement operation. Further, the batteries can be replaced while the electronic device is continuously being powered by the batteries, as discussed earlier in the "make-before-break" electrical coupling arrangement for the battery holder 218, 222, 226. Therefore, the simple insertion of batteries at one end of the sequence of battery holders effects the battery replacement operation.

Thus, the simplified battery replacement operation is more reliable, because a user makes one simple insertion motion to both insert the fresh battery 238 and to push out the battery being replaced 216. Further, it allows replacement of the battery while the electronic device is continuously under power, and with uninterrupted use. For a pager, this can prevent information from being lost from the memory 20. It can also prevent a message, such as may be transmitted from a paging system, from not being received and stored by the pager, even while the battery 216 is being replaced. These features provide significant advantages for battery operated electronic devices over known battery holding arrangements. Portable electronic devices, such as selective call receivers, in applications requiring continuous uninterrupted operation can especially benefit from the present invention.

What is claimed is:
1. A battery operated electronic device, comprising:
electronic circuits; and
a battery holder electrically coupled to the electronic circuits for holding a first replaceable battery and for electrically coupling the first replaceable battery and the electronic circuits, the battery holder comprising:
means for inserting the first replaceable battery in the battery holder in a horizontal direction;
means for horizontally displacing the first replaceable battery in the battery holder with a second replaceable battery while allowing the electrical coupling of the electronic circuits with the second replaceable battery before electrically un- coupling the electronic circuits from the first replaceable battery, wherein the second replaceable battery displaces the first battery in the same horizontal direction;

a housing having a battery compartment for securing the battery holder in the battery operated electronic device; and a first door for the battery compartment, the second replaceable battery utilized to open the first door for replacing the first replaceable battery in the battery holder with the second replaceable battery while the first replaceable battery opens and exits a second door for the battery compartment.

2. The battery operated electronic device of claim 1, wherein the means for horizontally displacing is constructed and arranged to allow the second replaceable battery to push the first replaceable battery horizontally out from the battery holder for replacing the first replaceable battery in the battery holder with the second replaceable battery.

3. The battery operated electronic device of claim 1, wherein the means for horizontally displacing comprises means for electrically coupling the electronic circuits with the second replaceable battery before electrically uncoupling the electronic circuits from the first replaceable battery.

4. The battery operated electronic device of claim 3, wherein the means for electrically coupling comprises a spring mounted battery contact and a fixed battery contact, the spring mounted battery contact being arranged in substantially opposing orientation to the fixed battery contact to maintain securing pressure on the first replaceable battery in the battery holder, while allowing the second replaceable battery to displace the first replaceable battery from the battery holder during battery replacement.

5. A selective call receiver having electronic circuits, comprising:

receiving means for receiving paging information including a message;

an annunciator for alerting that the message has been received; and presenting means for presenting the message to a user; and a battery holder electrically coupled to the electronic circuits for holding a first replaceable battery and for electrically coupling the first replaceable battery and the electronic circuits, the battery holder comprising:

means for inserting the first replaceable battery in the battery holder in a horizontal direction;

means for horizontally displacing the first replaceable battery in the battery holder with a second replaceable battery while allowing the electrical coupling of the electronic circuits with the second replaceable battery before electrically uncoupling the electronic circuits from the first replaceable battery, wherein the second replaceable battery displaces the first battery in the same horizontal direction;

a housing having a battery compartment for securing the battery holder in the battery operated electronic device; and at least one entry door and at least one exit door horizontally opposed from the entry door for the battery compartment, wherein the second replaceable battery horizontally displaces the first replaceable battery from the battery holder by pushing open the at least one entry door, thereby pushing the first replaceable battery out from the battery holder, and wherein the first replaceable battery in response thereto pushes open the at least one exit door for displacing therefrom.

6. The selective call receiver of claim 5, wherein the means for horizontally displacing comprises means for electrically coupling the electronic circuits with the second replaceable battery before electrically uncoupling the electronic circuits from the first replaceable battery.

7. The selective call receiver of claim 5, wherein the means for horizontally displacing is constructed and arranged to allow the second replaceable battery to push the first replaceable battery out from the battery holder for replacing the first replaceable battery in the battery holder with the second replaceable battery.

8. The selective call receiver of claim 5, wherein the battery holder further comprises a spring mounted battery contact, a separately spring mounted battery holding structure having a gripping structure, and a fixed battery contact having a catching structure, both the spring mounted battery contact and the separately spring mounted battery holding structure arranged in substantially opposing orientation to the fixed battery contact to maintain securing pressure on the first replaceable battery in the battery holder, while allowing the second replaceable battery to displace the first replaceable battery from the battery holder during battery replacement.

9. A battery operated electronic device, comprising: electronic circuits; and first and second battery holders electrically coupled to the electronic circuits for holding first and second replaceable batteries and for electrically coupling the first and second replaceable batteries and the electronic circuits for delivering power thereto, each of the first and second battery holders having an entry and an exit, where the exit of the first battery holder is adjacent to the entry of the second battery holder, the first and second battery holders each comprising:

means for horizontally displacing the first and second replaceable batteries in the first and second battery holders with third and fourth replaceable batteries, where the third and fourth replaceable batteries are sequentially inserted in a horizontal direction into the entry of the first battery holder to sequentially electrically couple with the electronic circuits by horizontally sequentially displacing the second and first replaceable batteries from the second and first battery holders, respectively, in the horizontal direction;

a housing having a battery compartment for securing the battery holder in the battery operated electronic device; and at least one entry door and at least one exit door horizontally opposed from the entry door for the battery compartment, wherein the third and fourth replaceable batteries horizontally displaces the first and second replaceable batteries from the battery holder by pushing open the at least one entry door, thereby pushing the first replaceable battery out from the battery holder, and wherein the first replaceable battery in response thereto pushes open the at least one exit door for displacing therefrom.

10. The battery operated electronic device of claim 9, wherein the means for horizontal displacement comprises means for electrically coupling the electronic circuits to the third replaceable battery before electrically uncoupling the electronic circuits from the second replaceable battery, and electrically coupling the electronic circuits to the fourth replaceable battery before electrically uncoupling the electronic circuits from the first replaceable battery.

11. The battery operated electronic device of claim 9, wherein the first and second battery holders are arranged adjacent to each other such that the third replaceable battery being inserted into the entry of the first battery holder pushes the first replaceable battery out through the exit of the first battery holder and into the entry of the second battery holder, which then pushes the second replaceable battery out through the exit of the second battery holder, and subsequently the fourth replaceable battery being inserted into the entry of the first battery holder pushes the third replaceable battery out through the exit of the first battery holder and into the entry of the second battery holder, which then pushes the first replaceable battery out through the exit of the second battery holder, for replacing the second and first replaceable batteries with the third and fourth replaceable batteries in the second and first battery holders, respectively.

* * * * *